United States Patent [19]

Baas

[11] Patent Number: 5,452,276

[45] Date of Patent: Sep. 19, 1995

[54] TRACKING REGULATION CIRCUIT INCLUDING APPARATUS FOR DISABLING COARSE DRIVE SIGNALS

[75] Inventor: Dieter Baas, Kehl-Auenheim, Germany

[73] Assignee: Deutsche Thomson-Brandt/GmbH, Villingen-Schwenningen, Germany

[21] Appl. No.: 338,983

[22] Filed: Nov. 14, 1994

Related U.S. Application Data

[63] Continuation of Ser. No. 100,014, Jul. 30, 1993, abandoned, which is a continuation of PCT/EP92/00170, Jan. 28, 1992.

[30] Foreign Application Priority Data

Jan. 31, 1991 [DE] Germany .................. 41 02 801.5

[51] Int. Cl.⁶ .............................................. G11B 7/095
[52] U.S. Cl. ............................. 369/44.29; 369/44.32
[58] Field of Search ................... 369/32, 44.25, 44.28, 369/44.29, 44.32, 44.35, 44.36; 360/77.02–77.08, 77.11

[56] References Cited

U.S. PATENT DOCUMENTS

| | | | |
|---|---|---|---|
| 4,630,250 | 12/1986 | Nonomura | 369/32 |
| 4,677,603 | 6/1987 | Kenjyo | 369/32 |
| 4,731,771 | 3/1988 | Maeda et al. | 369/32 X |
| 4,736,353 | 4/1988 | Kasai et al. | 369/32 |
| 4,751,695 | 6/1988 | Kaku et al. | 369/44.32 X |
| 4,768,180 | 8/1988 | Janssen et al. | 369/44.32 |
| 5,130,963 | 7/1992 | Kusano et al. | 369/44.32 X |
| 5,151,888 | 9/1992 | Shikichi et al. | 369/44.32 |
| 5,161,243 | 11/1992 | Ishida et al. | 369/44.32 X |
| 5,202,872 | 4/1993 | Shinada | 369/44.32 |
| 5,247,503 | 9/1993 | Nomiyama et al. | 369/44.35 |

*Primary Examiner*—W. R. Young
*Attorney, Agent, or Firm*—Joseph S. Tripoli; Eric P. Herrmann

[57] ABSTRACT

An optical disc record playback apparatus includes tracking circuitry for radially translating the scanning pickup device during normal playback of the disc. Coarse and fine drive circuits are responsive to tracking error signals to provide coarse and more precise radial translations respectively. The tracking error signals are monitored for the occurrence for abnormalities such as may be produced by dust on the disc surface, and responsive to the detection of such abnormalities the coarse drive system is disabled to preclude the pickup from leaving the track.

12 Claims, 2 Drawing Sheets

TRACKING REGULATION CIRCUIT INCLUDING APPARATUS FOR DISABLING COARSE DRIVE SIGNALS

This is a continuation of application Ser. No. 08/100,014, filed Jul. 30, 1993, now abandoned, which is a continuation of application PCT/EP92/00170 filed 28 Jan. 1992, now WO 92/14240.

The invention relates to a tracking regulation circuit for a recording and/or playback apparatus (such as a compact disc player) with contact-less scanning of a recording medium having a fine and a coarse drive for guiding a scanning device along the data tracks of the recording medium.

BACKGROUND OF THE INVENTION

A compact disc player generates a light beam which is focused onto the recording medium by means of a focus regulation circuit, and which is guided along the data tracks of the disc by a tracking regulation circuit. Tracking regulation circuits typically include a coarse drive circuit for energizing apparatus to effect coarse or large radial displacements of the light beam, and a fine drive circuit for energizing apparatus to effect fine or precise radial displacements of the light beam. The coarse drive apparatus may, for example, be a motor which drives a spindle to translocate an optical scanning assembly. The optical scanning assembly may include several lenses, a prismatic beam-splitter and a photodetector, compliantly suspended and arranged for movement as a galvanometer. The galvanometer like arrangement effects at least the fine radial displacement.

Using the fine drive, the light beam can be moved by approx. ±0.5 mm in the radial direction which translates to about ±300 data tracks. Since this distance relates to only a very small percentage of the total number of tracks contained on a disc, the coarse drive must be energized from time to time, during normal playback, to provide continuous radial tracking of the light beam.

One disadvantage of a tracking regulation circuit with a coarse and a fine drive lies in the fact that the coarse drive may generate mechanical vibrations when energized. These vibrations will be mechanically transmitted to the optical scanning device. The vibrations are actually compensated for by the focus regulation circuit and the fine drive so that the scanning of the data is not interrupted through loss of focus or data tracking. If, however, while the coarse drive is operating, the compact disc player is subjected to external shocks or impacts, such as frequently occur in compact disc players installed in a vehicle, the vibrations caused by the coarse drive and the external shocks can reinforce each other. The consequences of this may be a tracking loss. In fact, under unfavorable conditions, the focus regulation circuit will no longer be able to focus the light beam onto the disc.

Disc faults such as scratches or fingerprints may also lead to tracking loss and to loss of focus if they occur while the coarse drive is running.

It is, therefore, the object of the invention to achieve reliable scanning of data with a recording and/or playback apparatus employing contact-less scanning of a recording medium, particularly in the case of external shocks and/or obstructions on, or defects in, the recording medium.

SUMMARY OF THE INVENTION

The invention is apparatus and a method within a disc playback apparatus which includes coarse and fine tracking drives and generates a tracking error signal for controlling the coarse and fine tracking drives. The tracking error signal is monitored during normal disc playback and if it deviates by a more than a predetermined amount, operation of the coarse drive is inhibited.

DETAILED DESCRIPTION

In an optical playback apparatus, for example, a compact disc player, a light beam scanning the data is focused onto the disc-type recording medium by means of a focus regulation circuit. In addition the light spot is maintained within respective tracks by virtue of a tracking circuit responsive to a tracking error signal developed by light reflected from the disc. If the light beam, as a consequence of an external impact on the apparatus is caused to exit the data track which is being scanned, the tracking error signal significantly increases. Such increases are nominally utilized to count track crossings when the scanning device is purposely caused to jump one or more tracks.

Figure 1:
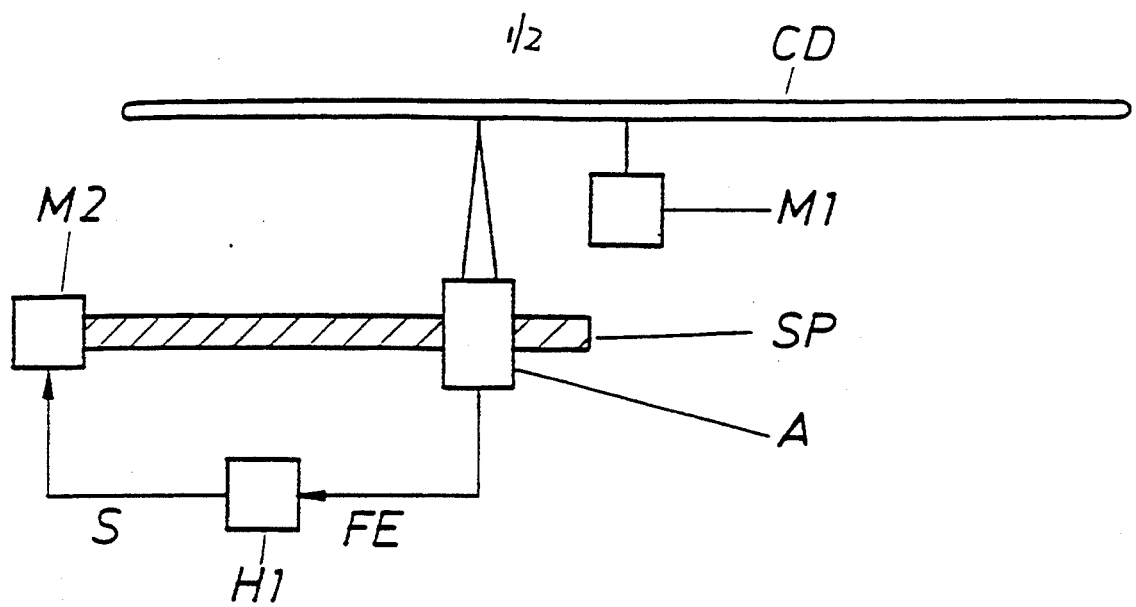
FIGS. 1 and 2 are partial pictorial and partial block diagrams of disc playback apparatus.

Referring to FIG. 1 a disc, CD, is caused to rotate about its axis by a motor M1. A second motor M2, mechanically coupled to an optical scanning assembly, A, by a spindle, SP, moves the optical scanning assembly radially across the disc in conformance with the data being recovered from the disc. The motor M2 thus forms the coarse drive of the optical assembly.

Responsive to the light reflected from the disc a tracking error signal, TE, and a focusing error signal, FE, are developed in a known manner. A detector H1, associated with the error signal generating circuitry, monitors the amplitude of the tracking or focusing error signal. If the level of the tracking or focusing error signal FE exceeds a predeterminable threshold value W, then the detector H1 sends a control signal, S, to the motor M2 which, if the coarse drive is switched off, prevents the coarse drive from being switched on and, if the coarse drive is switched on, switches off the coarse drive.

By disabling the coarse drive in such critical situations as when internal dirt or scratches on the disc or external shocks impair the scanning reliability, the reliability of the scanning is not further reduced by vibrations caused by the coarse drive. As soon as the disturbance, caused by external impacts or internal dirt and scratches on the disc, decays, the level of the high frequency vibrations in the tracking and focusing error signal increases again. If it reaches the predeterminable level, then the detector H1 re-enables the coarse drive M2.

Figure 2:
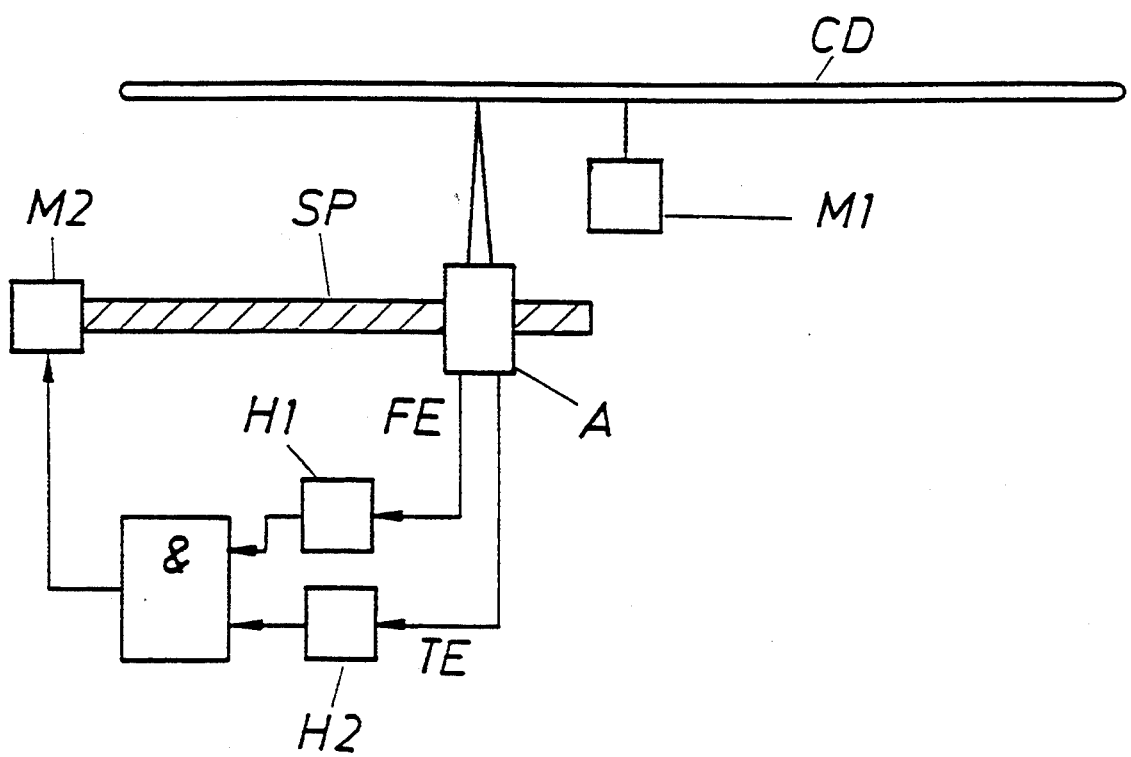
Figure 3:
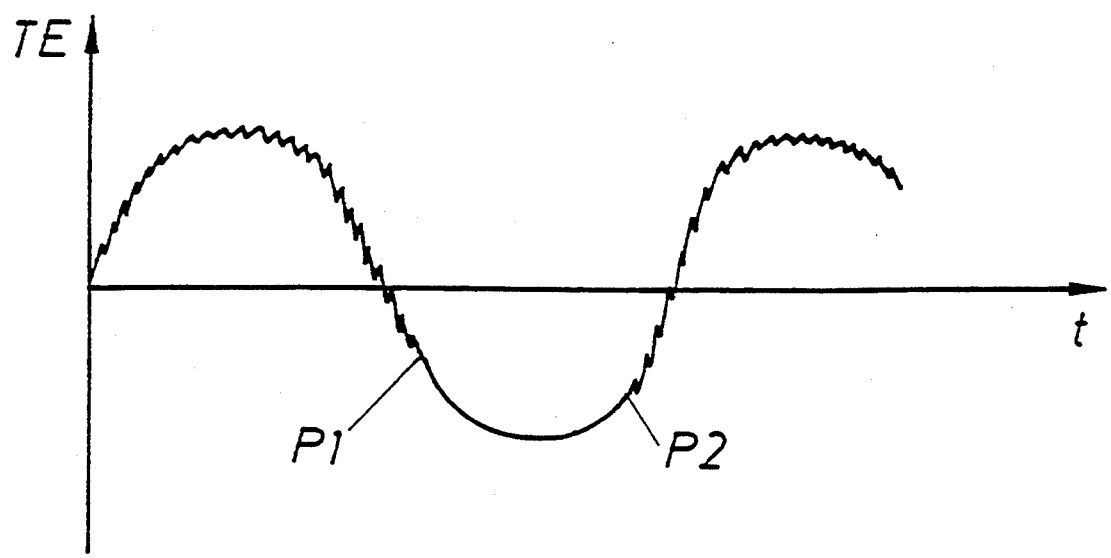
FIG. 3 is a waveform diagram of a tracking error signal.

A second embodiment example of the invention is illustrated in FIG. 2. The apparatus in FIG. 2 disables the coarse drive only if both the amplitude of the tracking error signal and the amplitude of the focusing error signal exhibit respective values outside a predeterminable threshold value.

The focusing error signal, FE, is applied to a first detector, H1, and the tracking error signal, TE, is applied to a second detector, H2. The outputs of the two detectors H1 and H2 are connected to the inputs of an AND gate, U, the output of which is connected to enable/disable the coarse drive motor M2. A further alternative to the FIG. 1 embodiment, which is also responsive to both the signals TE and FE, may be configured similar to the FIG. 2 embodiment with the exception that the AND gate be substituted with an OR gate.

Further measures to enhance the scanning reliability provide for increasing the gain of the fine drive circuit or the gain of the focus regulation circuit when the coarse drive is enabled. The gain or amplification in the fine drive or in the focus regulation circuit can, for example, be regulated in proportion to the power consumed by the coarse drive. The amplification of the two regulating circuits is then proportional to the current consumed by motor M2 for the coarse drive.

Scanning reliability may be further enhanced by increasing the gain of the fine drive circuit or the gain of the focus regulation circuit only during the start-up and braking phases of the coarse drive. The increase in the gain in the fine drive or in the focus regulation circuit may be delayed by a time equivalent to the inherent delay of the coarse drive apparatus.

Faults associated with the disc which develop coarse drive disabling signals can be ascertained for each track along with the duration or period of the errors. When the location and the duration of the errors of a disc are established, they may be stored and used to disable the coarse drive during subsequent scans of the respective tracks.

In order to attenuate mechanical vibrations in the focus and tracking regulation circuits caused by carrying forces, compensating impulses may be applied to these two regulating circuits when the coarse drive is switched off.

The invention is suitable for recording and/or playback apparatus with contact-less scanning of a recording medium, and including tracking regulation circuits constructed with coarse and fine drives. Examples of this are compact disc players, video disc players, DRAW disc players and magneto-optical apparatus.

What is claimed is:

1. In a tracking regulation circuit for a disc playback apparatus employing contact-less scanning of a record medium and including both a fine and a coarse drive system responsive to a tracking error signal, TE, for providing radial translation of the scanning device as the record medium is scanned during normal playback, an improvement comprising:
    means for monitoring said tracking error signal and providing a control signal when the tracking error signal, TE, exhibits predetermined abnormalities; and
    means responsive to the control signal for disabling only the coarse drive system when the tracking error signal, TE, exhibits such predetermined abnormalities.

2. The tracking regulation circuit set forth in claim 1 wherein said contact-less scanning is performed by optical means including a focusing system which generates a focusing error signal and responsive thereto maintains a beam of light substantially focused on tracks of said recording medium, and wherein the improvement further comprises
    means for monitoring said focusing error signal and providing a further control signal when the focusing error signal exhibits predetermined abnormalities; and
    means responsive to the further control signal for disabling the coarse drive system when the focusing error signal exhibits such predetermined abnormalities.

3. The tracking regulation circuit set forth in claim 2 characterized in that the coarse drive system is only disabled when said abnormalities occur concurrently in both the tracking error signal and the focusing error signal.

4. The tracking regulation circuit set forth in claim 2 further including an OR circuit having a first input terminal coupled to receive said control signal and a second input terminal coupled to receive said further control signal and having an output terminal coupled to disable said coarse drive system.

5. The tracking regulation circuit set forth in claim 2 further including an AND circuit having a first input terminal coupled to receive said control signal and a second input terminal coupled to receive said further control signal and having an output terminal coupled to disable said coarse drive system.

6. In a tracking regulation circuit for a disc playback apparatus employing contact-less scanning of a record medium and including both a fine and a coarse drive system responsive to a tracking error signal, TE, for providing radial translation of the scanning device as the record medium is scanned during normal playback, an improved method of controlling said playback apparatus comprising:
    monitoring said tracking error signal and providing a control signal when the tracking error signal, TE, exhibits predetermined abnormalities; and
    disabling only the coarse drive system, responsive to the control signal, when the tracking error signal, TE, exhibits such predetermined abnormalities.

7. The tracking regulation circuit set forth in claim 6 wherein said contact-less scanning is performed by optical means including a focusing system having a variable gain control element for maintaining focus, which system generates a focusing error signal and responsive thereto maintains a beam of light substantially focused on tracks of said recording medium, and wherein the improved method further comprises
    monitoring said focusing error signal and providing a further control signal when the focusing error signal exhibits predetermined abnormalities; and
    disabling the coarse drive system, responsive to the further control signal, when the focusing error signal exhibits such predetermined abnormalities.

8. The improved method set forth in claim 7 wherein said coarse drive is subject to being enabled and disabled and said method further includes providing increased gain to said variable gain control element in the focusing system when the coarse drive system is enabled.

9. The improved method set forth in claim 8 wherein said fine drive system includes a variable gain element, and said playback apparatus includes means for detecting power consumed by said coarse drive system, and said method further includes providing increased gain to said variable gain element in the fine drive system in proportion to detected power consumed by the coarse drive system.

10. The improved method set forth in claim 7 wherein said fine drive system includes a variable gain element, said coarse drive is subject to being enabled and disabled, and said method further includes providing increased gain to said variable gain element in the fine drive system when the coarse drive system is enabled.

11. The improved method set forth in claim 10 wherein said coarse drive system is subject to start-up and braking phases of the coarse drive system when the coarse drive system is enabled and disabled, and said method further includes providing said increased gain in the fine drive system only during start-up and braking phases of the coarse drive system when the coarse drive system is enabled and disabled respectively.

12. The improved method set forth in claim 10 wherein said playback apparatus includes means for detecting power consumed by said coarse drive system, and said method further includes providing increased gain in the focusing system in proportion to detected power consumed by the coarse drive system.

* * * * *